United States Patent [19]

Beall et al.

[11] 4,328,299
[45] May 4, 1982

[54] POLYCHROMATIC GLASSES AND METHOD

[75] Inventors: George H. Beall, Big Flats; Syed N. Hoda, Horseheads; Richard W. Waldron, Big Flats, all of N.Y.

[73] Assignee: Corning Glass Works, Corning, N.Y.

[21] Appl. No.: 171,655

[22] Filed: Jul. 23, 1980

[51] Int. Cl.³ .......................... G03C 1/00; G03C 5/24
[52] U.S. Cl. ...................................... 430/13; 430/351; 430/542; 430/541; 430/495; 65/33; 65/30.1; 65/30.11; 252/301.4 F; 501/32
[58] Field of Search ............... 430/351, 353, 541, 542, 430/495, 13; 60/30.11, 33, 30 R; 252/301.4 F; 106/52

[56] References Cited

U.S. PATENT DOCUMENTS

| | | | |
|---|---|---|---|
| 2,515,939 | 7/1950 | Stookey | 430/13 |
| 3,208,860 | 9/1965 | Armistead et al. | 65/33 |
| 3,522,191 | 7/1970 | Turner et al. | 252/301.6 R |
| 3,663,193 | 5/1972 | Wilson | 65/33 |
| 4,057,408 | 11/1977 | Pierson et al. | 65/33 |
| 4,134,747 | 1/1979 | Pierson et al. | 65/30 R |

*Primary Examiner*—Won H. Louie, Jr.
*Attorney, Agent, or Firm*—Clinton S. Janes, Jr.

[57] ABSTRACT

Polychromatic glass articles and methods of producing such articles are disclosed in which the glass is activated by exposure to ultraviolet radiation and contains as a sensitizing agent an oxide of copper, samarium, terbium, praeseodymium, or europium.

14 Claims, 2 Drawing Figures

POLYCHROMATIC GLASSES AND METHOD

BACKGROUND OF THE INVENTION

The invention is concerned with a form of photosensitively colorable glass known as polychromatic glass. This is a transparent glass capable of having developed therein a range of colors that essentially span the color spectrum. Color is developed in a polychromatic glass by certain combinations of radiation exposure and thermal treatment. Variation of color within a given glass results primarily from variation in the initial exposure flux which is defined as the product of radiation intensity and exposure time.

U.S. Pat. No. 4,017,318, granted Apr. 12, 1977 to Pierson and Stookey, describes the physical and chemical characteristics of polychromatic glasses; also, general methods of developing a range of colors in such glasses. The disclosure of that patent, in its entirety, is incorporated herein by reference.

As disclosed in the Pierson-Stookey patent, polychromatic glasses can be composed of a wide range of base compositions. However, each must contain silver, an alkali metal oxide (preferably $Na_2O$), fluoride, and at least one halide selected from the group of chloride, bromide, and iodide. The glasses may be irradiated with either high energy or actinic radiations. Where the actinic radiation is supplied as ultraviolet radiation, cerium oxide ($CeO_2$) is a required component of the glass composition.

In one of the methods described in the patent, the glass is initially exposed to high energy or actinic radiations selected from the group of high velocity electrons, X-radiations, and actinic radiations in the ultraviolet portion of the spectrum, preferably in the range of about 2800 Å–3500 Å. This exposure develops a latent image in the glass. The intensity and time of the exposure primarily determine the final color which will be produced in the glass.

Thereafter, the glass is subjected to a heat treatment at a temperature between its transformation range and its softening point. This causes precipitation of colloidal silver particles in situ to act as nuclei. Where a transparent final product is desired, the heat treatment is of such duration as to effect the precipitation of colloidal silver nuclei and to cause the growth thereon of extremely small microcrystals of alkali metal fluoride-silver halide, e.g., $NaF+AgCl$ and/or $AgBr$ and/or $AgI$. If an opal glass product is sought, the heat treatment will be continued for a sufficient length of time to not only promote the precipitation of colloidal silver nuclei, but also to effect the growth of said microcrystals on the silver nuclei to a size large enough to scatter light.

The nucleated glass is then cooled conveniently to room temperature but, in any event, to a temperature at least 25° C. below the strain point of the glass. Then, it is again exposed to high energy or actinic radiations. This second exposure intensifies the color, the hue of which was previously determined via the first exposure. Finally, the glass is reheated to a temperature between about the transformation range and the softening point of the glass to produce the desired color in the glass. It has been theorized that submicroscopic particles of metallic silver are precipitated as discrete colloidal particles and/or deposited on the surface and/or within the alkali metal fluoride-silver halide microcrystals.

The mechanism of the color phenomenon is not undisputably known. However, the quantity of silver precipitated and the geometry thereof, as well as, perhaps, the refractive index of the crystals, are deemed to determine the color produced. In any event, the colors are achieved with very low silver contents and exhibit characteristics similar to interference colors. Hence, it was surmised that at least one of the three following circumstances is present: (1) discrete colloidal particles of silver less than about 200 Å in the smallest dimensions; (2) metallic silver deposited within alkali fluoride-silver halide microcrystals, the silver-containing portion of the microcrystals being less than about 200 Å in the smallest dimensions; and (3) metallic silver deposited upon the surface of said microcrystals, the silver-coated portion of the microcrystals being less than about 200 Å in the smallest dimension.

The patent discloses that the heat treatment after each exposure to high energy or actinic radiation may consist of a series of heatings and coolings rather than a single heat treating cycle. This does not change the color developed, but can improve color intensity.

The patent further teaches a sequence of colors that may be developed by progressively increasing the magnitude of the exposure flux in the initial exposure step. Thus, progressively increasing the radiation flux (by increasing intensity, time, or both) successively produces pale yellow, green, blue, violet, red, orange, and dark yellow colors.

U.S. Pat. No. 4,092,139, granted May 30, 1978 to J. Ference, discloses an alternate color developing procedure whereby the second exposure (the re-exposure) of the Pierson-Stookey method is carried out at a temperature between 200° and 410° C. to cause the metallic silver to precipitate. This obviates the separate reheating step. Also, U.S. Pat. No. 4,134,747, granted Jan. 16, 1979 to Pierson and Stookey, describes a procedure wherein the potentially polychromatic glass is melted in a reducing atmosphere. During the color development procedure, this modification produces a so-called reverse opal effect. Thus, exposed portions of the glass remain transparent, although colored, and unexposed portions of the glass become opacified.

The earlier Pierson-Stookey patent (318) indicates that the exact reaction path leading to coloration is not known with certainty. However, a proposed explanation is that silver nuclei are photosensitively precipitated, using cerous ions as a photosensitizing agent, as illustrated by this equation: $Ag^+ + Ce^{+3} + h\nu \rightarrow Ag° + Ce^{+4}$. The nucleation and growth of complex silver plus alkali metal (Na) halide crystals is then proposed as follows:

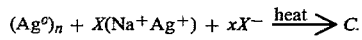

C is a crystallite of the nature $(Ag°)_n x(Na^+ + Ag^+)X$ and $X^-$ is a halide ion. The development of the colored species, resulting from a second radiation step and second heat treatment, is then expressed as:

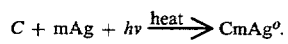

$CmAg°$ is a crystal having granular particles of metallic (m) silver formed on, or dispersed within, it.

The patent concludes that, when ultra-violet light is used as the source of radiation, at least about 0.01% $CeO_2$ is required as a photosensitizing agent. To demonstrate this requirement, the patent sets forth comparative Examples 17 and 18. The glasses of these examples are identical in composition and treatment, except that the glass of Example 18 contains $CeO_2$ and that of Example 17 does not. Similarly, the glass of Example 18 is reported to function as a polychromatic glass while that of Example 17 does not.

PURPOSES OF THE INVENTION

Cerium oxide, in the form of $Ce_2O_3$ or cerous ions ($Ce^{+++}$), is a very effective activator with high quantum efficiency. However, it also has a high absorptivity in the ultraviolet region of the spectrum. Consequently, penetration of ultraviolet radiation into a cerium-containing glass occurs only in a shallow surface layer. This, in turn, results in a correspondingly shallow color layer in a cerium-sensitized polychromatic glass.

It would be desirable, then, to have available a sensitizing agent with low absorption for the activating wavelength of radiation. This would enable producing color to a substantial depth in a glass. Also, with two or more activators that are sensitive at different wavelengths, it would be possible to develop different colors at different depths in a glass article.

Finally, the cerous ion level may be increased in a glass to shorten processing time, or otherwise enhance glass behavior. However, there is then a tendency for the tail of the absorption curve to extend into the visible and produce a yellow color. It would then be desirable to have a sensitizer with absorption at shorter wavelengths. This would permit very high levels of sensitizer to be used without uncontrolled development of color.

It is a primary purpose of the invention to meet these various needs and problems. Other purposes, advantages and features will become apparent from the ensuing description.

SUMMARY OF THE INVENTION

Contrary to prior experience and belief, we have found that cerium oxide ($CeO_2$) is not required as a photosensitizing agent in a polychromatic glass. Rather, we have found that a complete range of polychromatic colors can be developed utilizing one or more oxides, selected from copper, samarium, terbium, praeseodymium, and europium oxides, to activate the glass.

In general, the characteristics of the present glasses, and the effective methods of treatment, otherwise closely parallel those of known polychromatic glasses. However, the present method is limited to activation of the glass by ultra-violet radiation. This takes advantage of the absorption and sensitizing characteristics of the present glasses, and more particularly their unique sensitizing agents.

Our invention then is a polychromatic glass article wherein at least a portion thereof is integrally colored by silver, said portion containing microcrystals of alkali fluoride in a concentration of at least 0.005% by volume, the silver being in the form of metallic particles less than 200 A in the smallest dimension, and optionally being dispersed within or deposited on the crystals, the glass containing one or more oxides of copper, samarium, terbium, praeseodymium, and europium as an activating agent.

The invention further comprises a method of making a polychromatic glass article, wherein at least a portion of the article is integrally colored by silver, consisting of melting a glass batch containing the constituents of an alkali fluoride and at least one silver halide selected from the group consisting of silver chloride, silver bromide and silver iodide, and at least one sensitizing agent selected from the oxides of copper, samarium, terbium, praeseodymium, and europium, forming such melt into a glass article, exposing at least a portion of such article to ultraviolet radiation at ambient temperature, heating the exposed glass to a temperature between its transformation range and its softening point for a sufficient length of time to cause growth of microcrystals of alkali fluoride with at least one silver halide selected from the group consisting of silver chloride, silver bromide and silver iodide, thereafter subjecting the article to a second ultraviolet radiation exposure and a second heat treatment to cause metallic silver particles less than 200 Å in the smallest dimension to be deposited as discrete colloidal particles, or within or on the surface of the alkali fluoride microcrystals, and cooling the article.

PRIOR ART

Certain polychromatic glass patents were mentioned earlier. In addition, prior patents disclose characteristic oxides of the present invention as glass additives for other purposes.

A photosensitive glass is altered, by exposure to actinic type radiation, in such a manner that irradiated areas are capable of heat-developed coloration while non-irradiated areas remain unchanged. U.S. Pat. No. 2,326,012 and No. 2,422,472 to R. H. Dalton disclose that copper-containing glasses may be rendered photosensitive when melted reducingly, e.g., with tin oxide as a reducing agent in the melt. U.S. Pat. No. 2,515,938 to S. D. Stookey discloses enhancing photosensitivity in the Dalton glasses by adding cerium oxide ($CeO_2$). U.S. Pat. No. 2,515,936 to W. H. Armistead discloses corresponding silver-containing photosensitive glasses.

Photochromic glasses, also referred to as phototropic glasses, are characterized by their optical transmittance varying reversibly with the intensity of incident actinic radiation. The basic patent in this area, U.S. Pat. No. 3,208,860 to S. D. Stookey and W. H. Armistead, describes in detail the presence of silver halide microcrystals as an active agent in such glasses. It further discloses that a reducing agent, such as the oxide of arsenic, antimony, iron, or copper, may enhance metallic silver formation. U.S. Pat. No. 3,269,847 and No. 3,278,319 to A. J. Cohen describe phototropic (photochromic) glasses wherein europous ions ($Eu^{++}$) or cerous ions ($Ce^{+++}$) are the active agent. Such ions are said to be excited by short wavelength radiation to form trapped electron color centers.

Luminescent phosphor materials are widely used and well known. Numerous proposals have been made for glasses exhibiting similar properties, but commercial success has been elusive. U.S. Pat. No. 2,049,765 to Hellmuth Fischer discloses bringing together in a glass the ground mass and the sensitizing metal of a phosphor material. A wide range of sensitizing metals includes the rare earth metals and copper. U.S. Pat. No. 3,323,926 to T. G. O'Leary discloses silver-containing, silicate glasses that are rendered fluorescent by irradiation plus heat treatment. The presence of tin and/or cerium oxides enhances sensitivity. A series of U.S. Pat., No. 3,440,172; No. 3,506,587; No. 3,522,190; No. 3,522,191, to M. J. Albinak and W. H. Turner, discloses numerous activator oxides in photoluminescent glasses. These includes oxides of copper, tin, antimony, samarium, and europium. U.S. Pat. No. 3,654,172 to R. F. Reade discloses terbium-activated radioluminescent glasses, while U.S. Pat. No. 4,038,203 to Tatsuo Takahashi discloses thallium or silver with europium or terbium in phosphate photoluminescent glasses.

GENERAL DESCRIPTION

The sensitizing or activating agents employed in the glasses of the present invention are the essential distinguishing characteristic. Thus, the invention is based on introducing one or more of the oxides of copper, samarium, terbium, praeseodymium, and europium into a polychromatic glass, and maintaining such oxide(s) in a lower oxidation or valence state to at least partially replace cerium oxide as a sensitizing agent.

Heretofore, cerous ions ($Ce^{+++}$) were considered a necessary and unique sensitizing agent in a polychromatic glass when ultraviolet light was employed as the activating radiation. Now, they may be replaced entirely if desired. However, the presence of cerous ions is not necessarily precluded, and they may be present as a secondary or supplemental sensitizer.

As compared to cerous ions, the new sensitizers tend to be responsive to lower wavelength radiation, as well as being less absorptive of such radiation. Hence, it is contemplated that a glass containing, for example, cerium and samarium oxides might be exposed, successively, to 300 nm radiation and 270 nm radiation. The cerium oxide would be effective as a sensitizer at the 300 nm wavelength, while the samaria would be effective at the lower wavelength.

Even trace amounts of the sensitizing agents appear to have some effect. However, as a practical matter, the content of sensitizing agent will be at least 0.01% by weight of the glass. The effective amount to produce a given color effect will vary with exposure flux (time and/or intensity), base glass composition, halide and silver concentrations and processing factors. Amounts up to 0.25% have been used effectively and larger amounts may be employed, although not necessarily to any advantage.

Other minor additives are employed in the manner and amount, and for the purposes, fully explained in the prior patent literature, especially the Pierson-Stookey and Ference patents. Thus, a sodium silicate base glass is contemplated that contains at least 0.0005% silver (Ag), at least one percent fluorine (F), and sufficient chlorine (Cl), bromine (Br), and/or iodine (I) to react stoichiometrically with the silver. In addition to these additives, it is desirable to employ from 0.01 up to about 1% of antimony and/or tin oxides as a thermoreducing agent.

Except as otherwise indicated herein, the present invention does not contemplate any substantial change in previously disclosed methods of treatment. To avoid repetition then, reference is made to the Pierson-Stookey and Ference patents, the teachings of which are incorporated herein in their entirety, except as distinguished. For instance, the sensitizers of the present invention, like cerous ions, are effective only with ultraviolet radiation. Hence, use of a high energy source of radiation is not contemplated.

In general, the present glasses will be exposed to a source of ultraviolet radiation which may be selected from well known sources such as mercury and mercury-xenon vapor arc lamps. The initial exposure determines the ultimate color which only appears after subsequent treatment. Color will depend on exposure flux which is a product of time and intensity.

The exposed glass, having a latent image or color development therein, is heat treated at a temperature between the glass transformation temperature and softening point. This causes growth of alkali metal fluoride-silver halide microcrystals on colloidal silver nuclei.

The glass is then exposed to ultraviolet radiation a second time. This may be in conjunction with a second heat treatment, as taught by Ference, or may be a step separate from the final heat treatment. If the second heat treatment is separate, it too should be at a temperature between the glass transformation temperature and softening point. However, if a combined radiation and heat treatment is employed, a substantially lower temperature will be employed. As explained later, a secondary feature of the present invention is a rather lower temperature for such combined treatment which will be below 300° C.

The theory of our invention is further explained relative to glasses containing copper oxide as a sensitizing agent. However, it is believed each of the new sensitizers functions in similar manner. Hence a corresponding explanation with reference to any one of the sensitizers would be equally valid and appropriate. However, based on present knowledge, copper oxide is the preferred new lower wavelength sensitizer.

Our studies show that monovalent (cuprous) copper ions are capable of activating silver colloids, and effecting photosensitive nucleation of sodium fluoride, in a similar manner to cerous ions ($Ce^{+++}$). Analogizing to the explanation offered by Pierson-Stookey for the role played by cerium, it appears that, under ultraviolet exposure, copper can donate electrons to ionic silver according to this reaction:

$$Cu^+ + Ag^+ \rightarrow Cu^{++} + Ag°$$

It has been observed that a one mm. thick glass sample containing 0.025% $Cu_2O$ shows a gradual transmission cutoff from 85% to 320 nanometers (nm.) to 5% at 270 nm. Further, peak absorption for the cuprous ion, in various types of glass, has been reported at values of 230 to 250 nm. These wavelength values are substantially shorter than for cerous ions where peak absorption is around 300 nm. and sensitivity is in the range of 270 to 350 nm.

The shorter wavelength absorption characteristics of copper, as well as of the other sensitizers, provides distinct advantages over cerium. For example, larger percentage additions can be made without concern for producing an absorption tail in the visible spectral region. This avoids the condition of a yellow color throughout the glass. As a consequence, copper levels over 0.25% may be employed without background color problems.

In general, the same range of colors may be produced in the present glasses as with cerium-sensitized glasses. However, exposure and heat treating conditions will vary somewhat, and experimentation is necessary to ascertain optimum conditions in a particular glass.

For example, copper-activated glasses are sensitive to redox conditions. This may be observed visually. Excess reduction tends to give the glass a yellow cast due to precipitated silver, and excess oxidation imparts a blue color due to cupric ions ($Cu^{++}$). Proper redox conditions leave a colorless appearance in the glass. As in earlier polychromatic glasses, redox conditions may be controlled with thermoreducing agents, preferably, antimony oxide additions (oxidation) and tin oxide additions (reduction).

No effect of copper ions on the range of available polychromatic colors has been observed. Nonetheless, an interesting effect on treatment conditions has been observed. Thus, at a 0.1% CuO level, the initial exposure time required for a given color effect is about twice the corresponding time with cerium. When the second heat treatment and second exposure are carried out simultaneously, as taught by Ference, a temperature of 300° C. is normally used with a cerium-activated glass. However, this temperature produces dark brown and green colors in a copper-containing glass. It has been found necessary, then, to reduce the temperature to a lower value to produce the normal range of colors. This suggests that copper, unlike cerium, may be dispersed in the glass initially, but somehow becomes associated with the halide crystallites in the final step. This may be explained on the basis that the cuprous ion ($Cu^+$), unlike the cerous ion ($Ce^{+++}$), is monovalent. This, in turn, enables it to enter the halide crystal in partial substitution for the sodium ion ($Na^+$) or the silver ion ($Ag^+$).

SPECIFIC EMBODIMENTS

The invention is further described with reference to specific embodiments. These are chosen primarily to illustrate particular features or characteristics of the invention, and are not intended to limit its scope.

In one phase of exploring the invention, a simple alkali silicate glass was chosen as a base glass. While the basic formula of this glass was held constant, a variety of different additive combinations was used to make a comparative study. The base glass formula, in parts by weight on an oxide basis, consisted of 72 parts $SiO_2$, 16 parts $Na_2O$, 6.7 parts $Al_2O_3$, and 4.8 parts ZnO.

TABLE 1 sets forth several of the additive combinations used to supplement this base glass in developing glass batch formulae for present studies. It is not known with which cation(s) the halides are combined. Hence, they are merely reported as fluoride, chloride, etc., in accordance with conventional glass analytical practice. Likewise, inasmuch as the silver is present in such small amounts, it is simply tabulated as Ag.

The actual batch ingredients can comprise any materials, for example, oxides or other compounds, which, when melted together, will be converted into the desired constituents in the proper proportions. The halides were commonly added as alkali metal halides. Occasionally, where $Sn^{+2}$ was employed as a thermoreducing agent, $SnCl_2$ was utilized as a batch material for that purpose. Inasmuch as the sum of the individual glass constituents approximates 100, each may, for practical purposes, be deemed to be present in weight percent. Finally, the following examples represent laboratory melts. However, it will be recognized that large-scale commercial melts, utilizing pots or continuous tanks, can be undertaken with glasses of the present invention.

Batches of approximately 1000 grams were compounded, the ingredients ball milled together to assist in obtaining a homogeneous melt, and then run into platinum crucibles. The filled crucibles were placed into an electrically-fired furnace operating at about 1450° C., and maintained therein for about four to six hours with stirring. The melts were then poured into steel molds to produce slabs about 6 inches × 6 inches × ½ inch (15 cm. × 15 cm. × 1.2 cm.). The slabs were immediately transferred to an annealer operating at about 450°–480° C. The annealed slabs were colorless, transparent glass.

During the melting step up to as much as 50% by weight of the halide constituents, and up to 30% by weight of the silver, may be lost through volatilization.

TABLE 1

| | 1 | 2 | 3 | 4 | 5 | 6 | 7 | 8 | 9 |
|---|---|---|---|---|---|---|---|---|---|
| F | 2.44 | 2.50 | 2.50 | 2.50 | 2.50 | 2.50 | 2.50 | 2.50 | 2.51 |
| Br | 0.08 | 1.28 | 1.28 | 1.28 | 1.28 | 1.05 | 1.05 | 1.05 | 1.28 |
| Cl | 0.53 | — | — | — | — | — | — | — | — |
| Ag | 0.01 | 0.01 | 0.01 | 0.01 | 0.01 | 0.01 | 0.01 | 0.01 | .0125 |
| $Sb_2O_3$ | 0.49 | 0.20 | 0.20 | 0.20 | 020 | 0.20 | 0.20 | 0.20 | 0.20 |
| SnO | 0.10 | 0.05 | 0.05 | 0.05 | 0.05 | 0.05 | 0.05 | 0.05 | 0.05 |
| $CeO_2$ | — | — | — | — | — | 0.05 | 0.03 | 0.01 | — |
| CuO | 0.10 | — | — | — | — | — | 0.05 | 0.05 | — |
| $Sm_2O_3$ | — | 0.03 | — | — | — | — | — | — | 0.03 |
| $Pr_2O_3$ | — | — | 0.025 | — | — | — | — | — | — |
| $Tb_2O_3$ | — | — | — | — | 0.028 | — | — | — | — |
| $Eu_2O_3$ | — | — | — | 0.027 | — | — | — | — | — |

Each glass slab or plate thus produced was subdivided to provide a series of samples. These were subjected to a sequence of actinic radiation exposures and heat treatments in accordance with prior practice as described, for example, in the Pierson-Stookey patents mentioned earlier. In general, each group of samples was given an initial actinic radiation exposure with individual samples being progressively removed. This provided a series of samples with progressively longer exposure times.

In the illustrative examples that follow, two radiation systems were employed. In Example 1, glass samples were exposed to radiation from an 800 watt, high pressure, mercury vapor arc lamp having a substantial output in the vicinity of 300 nm. In the remaining examples, the glass samples were exposed to radiation from a high pressure, mercury-xenon vapor lamp, rated at 2500 watts. The radiation was reflected from a pair of 45° mirrors and collimated in a Model 390 Ultraviolet Exposure System manufactured by Optical Radiation Corporation. It will be appreciated that other ultraviolet radiation sources may be used. Actually, a source peaking at a lower wavelength should be more effective for present purposes.

Following exposure, each group of samples was given a predetermined heat treatment at a temperature above the glass transformation range. Each group was then cooled and subjected to a second actinic radiation exposure using the ultraviolet source previously employed. The individual samples within each group were given progressively longer exposures corresponding to the initial exposure practice. Finally, the several sample groups were given a second heat treatment. The first group was heat treated separately, while the remaining groups were given a combined second exposure and heat treatment in accordance with the practice disclosed in Ference U.S. Pat. No. 4,092,139.

EXAMPLE 1

The samples were exposed at ambient temperature to an 800 watt ultraviolet lamp positioned a distance of 18" (46 cm.) from the samples. Progressive exposure times of 0, 4, 8, 15, 30 and 60 minutes were employed with individual samples.

The samples were then heat treated at 460° C. for 30 minutes, cooled, and reheated at 540° C. for one hour. Following this, the samples were cooled and given a second exposure to the ultraviolet lamp. This exposure was at a distance of 9" (23 cm.) and progressive times were zero, 15, 30, 60 and 120 minutes.

The re-exposed samples were again heat treated, this time for 20 minutes at 460° C. Following this, the samples were examined and the following color development observed correlating with increasing initial exposure time: Monochrome blue-gray, magentas, and oranges. Colors were relatively intense.

EXAMPLE 2

The samples in this group were exposed at ambient temperature to a stronger source of radiation for a series of shorter times. Specifically a 2500 watt lamp was employed with light reflected twice by 45° mirrors, the total light path being 40 inches (100 cm.). Progressive individual exposure times were 0, ½, 1, 3, 4, 5, 6½ and 8½ minutes.

Following exposures, the samples were heat treated for 30 minutes at 520° C. The samples were then cooled and placed on a hot plate while being re-exposed to radiation from the lamp described above. Thus, the glasses combined a 460° C. heat treatment with progressive exposures as in Example 1, that is, 0, 15, 30, 60 and 120 minutes.

When this set of samples was cooled and examined, the following sequence of color development with increasing exposure was observed: Monochrome greens, yellow-green, dark green, bluish green, blue and browns. Color intensity was fair to good.

EXAMPLES 3, 4 and 5

The samples in each of these groups were treated in a manner identical to that described in Example 2. Thus, the same times and conditions of exposure and heat treatment were employed.

The following sequence of color development, corresponding to increasing initial exposure time, was observed in the samples of Example 3: Pistachio greens, bluish greens, and browns. The colors were less intense than those in Example 2.

An essentially corresponding sequence of colors was observed in the samples of Example 4. However, the colors were somewhat more intense than in Example 3.

The samples of Example 5 were observed to provide this sequence of color development: Light greens, bluish greens, and brownish ambers. Again, color intensity was somewhat greater than in Example 3.

EXAMPLES 6, 7 and 8

The samples in each of these groups were also treated in identical manner to those in Example 2, with one exception. A slightly different set of sample removal times was employed, thus creating a slightly different set of progressive exposure times. This new schedule was ¼, ½, 1, 1½, 2½, 3, 5, 6 and 8 minutes.

This series of color development was observed in the samples of Example 6: Greyish green, blue, purple, red, orange, and yellow. Color intensity was excellent.

The color sequence observed in the samples of Example 7 was: Green, blue, purple, and copper red. The colors were quite intense.

The samples of Example 8 demonstrated this color sequence: Light blues, dark blues, copper and red. Again, intensity was very good.

EXAMPLE 9

The samples in this group were exposed to light from the 2500 watt lamp of Example 2 in accordance with the conditions there described, except for exposure times. Progressive times for these samples were 0, 1, 2, 3, 4, 5, 6, 7, 8, 9, 10, 12, 14, 16, 18 and 20 minutes. Following this initial exposure, the samples were heat treated at 460° C. for ½ hour, cooled, reheated to 530° C., and held for ½ hour.

Thereafter, the samples were cooled and given a combined second exposure and heat treatment as described in Example 2. When cooled and observed, the samples showed this sequence of color development: Yellowish greens, greens, bluish greens, purples, and magentas. Color intensity was very good.

DESCRIPTION OF THE DRAWINGS

The unique characteristics of the invention are further illustrated with reference to the accompanying drawing wherein:

FIG. 1 depicts a series of spectrophotometric curves for a series of glasses wherein the essential ingredient difference is the sensitizing agent employed. In the graph, radiation wavelengths from 230 to 400 nm. are plotted along the horizontal axis, and percent transmittance at each wavelength is plotted along the vertical axis.

The measurements employed to plot the several curves were made on polished glass samples one mm. in thickness. The measuring instrument was a Varian Cary-17 DX spectrophotometer.

Curve A was measured on a glass essentially corresponding in composition to the glass of Example 2 in Ference U.S. Pat. No. 4,092,139, that is, a glass containing 0.04% cerium oxide as sensitizer. Curve B was measured on a glass having the composition of Example 1 in the TABLE above. Curve C was measured on a glass having the composition of Example 5 in the TABLE. Similar curves were plotted for similar sodium silicate glasses containing respectively, 0.06% $Sm_2O_3$, 0.05% $Pr_2O_3$, and 0.05% $Eu_2O_3$. These are not plotted in FIG. 1 since they are essentially indistinguishable from Curve C.

It will be observed that glasses with the present sensitizers have rather different transmittance curves. In particular, they transmit substantially further into the ultraviolet range than do cerium containing glasses.

Figure 2:
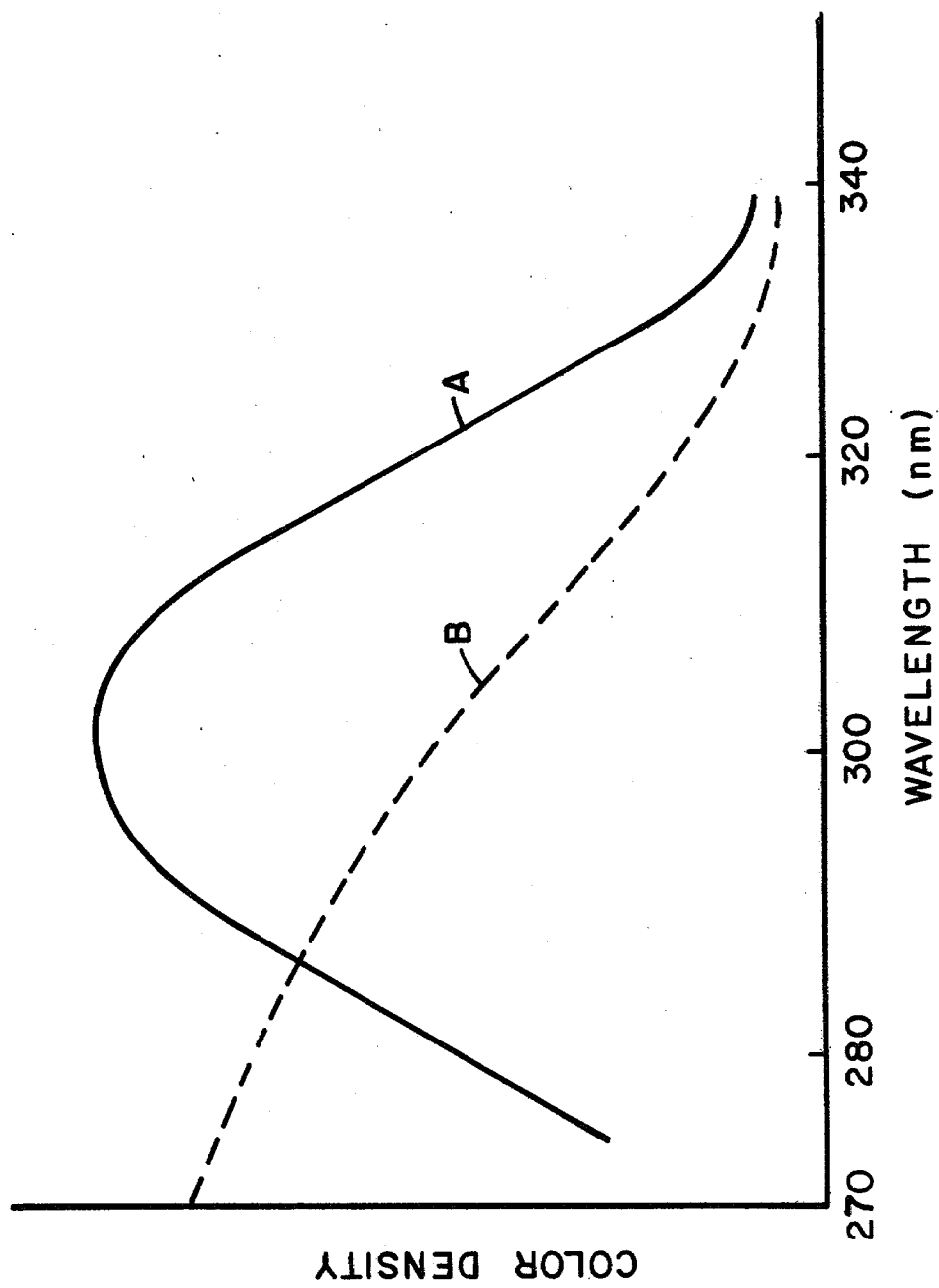
FIG. 2 is a graphical illustration comparing the spectral sensitivity of a cerium-sensitized glass with a copper-sensitized glass.

FIG. 2 shows the spectral sensitivity curve for the cerium-sensitized glass of Ference (Curve A) and that for the glass of Example 1 in the TABLE above (Curve B). Radiation wavelengths between 270 and 340 nm. are plotted on the horizontal axis. There are no absolute values for sensitivity on the vertical axis. Rather, relative densities of color development at different wavelengths of constant exposure were visually observed. Hence, no absolute comparison is contemplated, but only the obvious difference in general nature of the curves.

Figure 1:
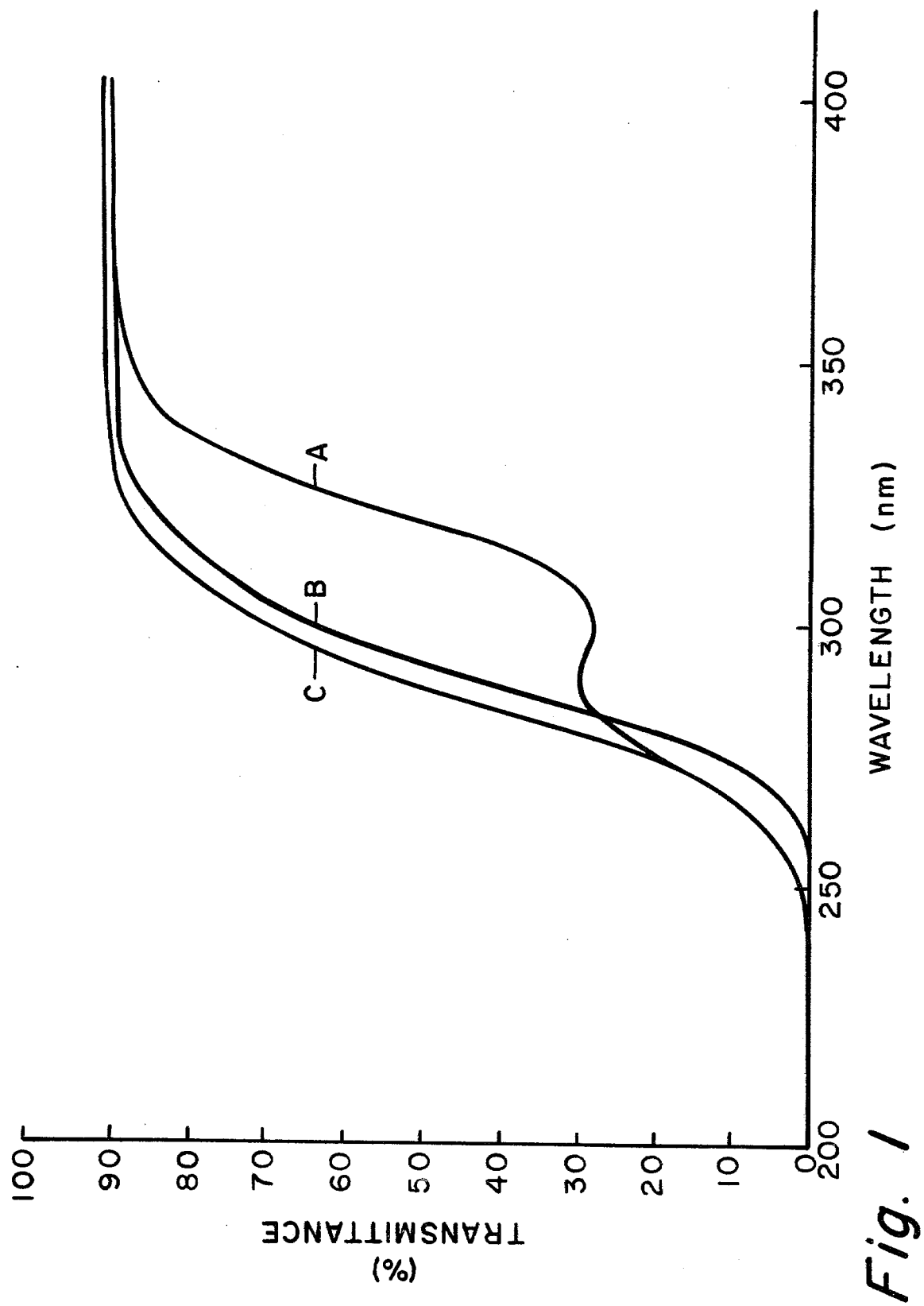
FIG. 1 is a graphical illustration of transmittance curves for glasses characterized by different sensitizing agents.

Specifically, the optimum wavelength for exposing the cerium-sensitized glass, the peak of the curve, is about 300 to 310 nanometers. In contrast, the copper-sensitized glass appears to peak below 270 nm. However, measurements could not readily be made at lower wavelengths; so that a peak value was not ascertained. It is apparent however, that such peak value is at or below 270 nm. This fact, coupled with the transmittance curves of FIG. 1, shows that the copper-sensitized glass may, for example, be exposed at 250 to 270 nm. In contrast, the cerium-sensitized glass is exposed in the 290–320 nm. range. Thus, a glass containing both sensitizers might have unique effects obtained by color development at different wavelengths.

We claim:

1. In a transparent polychromatic glass article wherein a portion of the article contains microcrystals of alkali fluoride with at least one silver halide selected from the group consisting of silver chloride, silver bromide, and silver iodide in a concentration of at least 0.005% by volume, and wherein the same portion is integrally colored by metallic silver particles less than 200 Å in the smallest dimension, the silver particles being deposited (a) as discrete colloidal particles, (b) within the microcrystals, and/or (c) on the surface of said microcrystals, the glass being characterized by the presence of ions of copper, samarium, terbium, praeseodymium, and/or europium in their higher oxidation state, and a portion of the article contains sodium fluoride, at least one silver halide selected from silver chloride, silver bromide, and silver iodide, and at least one sensitizing agent selected from the ions of copper, samarium, terbium, praseodymium, and/or europium in their lower oxidation state.

2. A polychromatic glass article in accordance with claim 1 in which the sensitizing agent is copper oxide.

3. A polychromatic glass article in accordance with claim 1 in which the glass contains cerium oxide as a supplemental sensitizing agent.

4. A polychromatic glass article in accordance with claim 1 in which the glass contains 0.1 to 1.0% of tin oxide and/or antimony oxide as a thermoreducing agent.

5. A polychromatic glass article in accordance with claim 1 wherein the selected sensitizing agent is present in an amount from 0.01% to 0.25%.

6. A polychromatic glass article in accordance with claim 1 wherein the alkali fluoride is sodium fluoride.

7. A method of making a transparent polychromatic glass article, wherein a portion of the article is integrally colored by silver, consisting of,
melting a glass batch containing the constituents of an alkali fluoride and at least one silver halide selected from the group consisting of silver chloride, silver bromide and silver iodide, and at least one sensitizing agent selected from the oxides of copper, samarium, terbium, praeseodymium, and europium,
forming an article from such melt, wherein said sensitizing agent being present as ions in their lower oxidation state,
exposing a portion of such article to ultraviolet radiation at ambient temperature,
heating the exposed glass to a temperature between its transformation range and its softening point, for a sufficient length of time to cause growth of microcrystals of alkali fluoride with at least one silver halide selected from the group consisting of silver chloride, silver bromide and silver iodide,
thereafter subjecting the article to a second ultraviolet radiation exposure and a second heat treatment to cause metallic silver particles less than 200 Å in the smallest dimension to be deposited as discrete colloidal particles, or within or on the surface of the alkali fluoride microcrystals, and,
cooling the article.

8. The method of claim 7 wherein the glass batch contains the constituents of sodium fluoride.

9. The method of claim 7 wherein the glass batch contains the constituents of silver bromide.

10. The method of claim 7 wherein the selected sensitizing agent in the glass batch is an oxide of copper.

11. The method of claim 7 wherein the glass article was exposed to ultraviolet radiation of less than 300 nm. wavelength.

12. The method of claim 7 wherein the second heating step and the second radiation exposure step are carried out simultaneously.

13. The method of claim 12 wherein the combined steps are carried out at a temperature below 300° C.

14. The method of claim 7 wherein the glass contains two sensitizing agents and is given separate ultraviolet radiation exposures at two different wavelengths.

* * * * *